United States Patent [19]
Graton et al.

[11] Patent Number: 5,695,034
[45] Date of Patent: Dec. 9, 1997

[54] TORSION DAMPER ESPECIALLY FOR A MOTOR VEHICLE

[75] Inventors: Michel Graton; Paolo Viola, both of Paris, France

[73] Assignee: Valeo, Cedex, Paris, France

[21] Appl. No.: 518,466

[22] Filed: Aug. 23, 1995

[30] Foreign Application Priority Data

Aug. 24, 1994 [FR] France .................... 94 10310

[51] Int. Cl.[6] ............................................ F16D 13/68
[52] U.S. Cl. ..................... 192/70.17; 192/213.12; 464/68
[58] Field of Search ................ 464/68; 192/213.1, 192/213.11, 213.12, 213.2, 213.21, 213.22, 213.3, 213.31, 70.17

[56] References Cited

U.S. PATENT DOCUMENTS

| | | |
|---|---|---|
| 4,860,871 | 8/1989 | Graton et al. |
| 5,160,007 | 11/1992 | Reik et al. ............... 192/70.17 |
| 5,301,780 | 4/1994 | Jackel ...................... 192/70.17 |
| 5,367,920 | 11/1994 | Bonfilio . |

FOREIGN PATENT DOCUMENTS

| | | |
|---|---|---|
| 2662767 | 12/1991 | France . |
| 2688840 | 9/1993 | France . |
| 4317332 | 12/1993 | Germany . |
| 2219373 | 12/1989 | United Kingdom . |
| 2233735 | 1/1991 | United Kingdom . |

*Primary Examiner*—Charles A. Marmor
*Assistant Examiner*—Saúl J. Rodríguez
*Attorney, Agent, or Firm*—Longacre & White

[57] ABSTRACT

A torsion damper includes a main damper and a predamper, each of which includes a pair of guide rings and a damper plate between the guide rings. The guide rings and damper plate of the main damper, together with the damper plate of the predamper, are provided with access holes in axial register with each other and defining a common axis extending in the axial direction, so as to form an access passage to enable a fastening tool to be inserted through the axial passage. The torsion damper, constituting (with other components) a clutch module, can thus be secured directly to the crankshaft of a motor vehicle. The guide rings of the predamper are disposed radially outwardly of the common axis of the access holes.

8 Claims, 1 Drawing Sheet

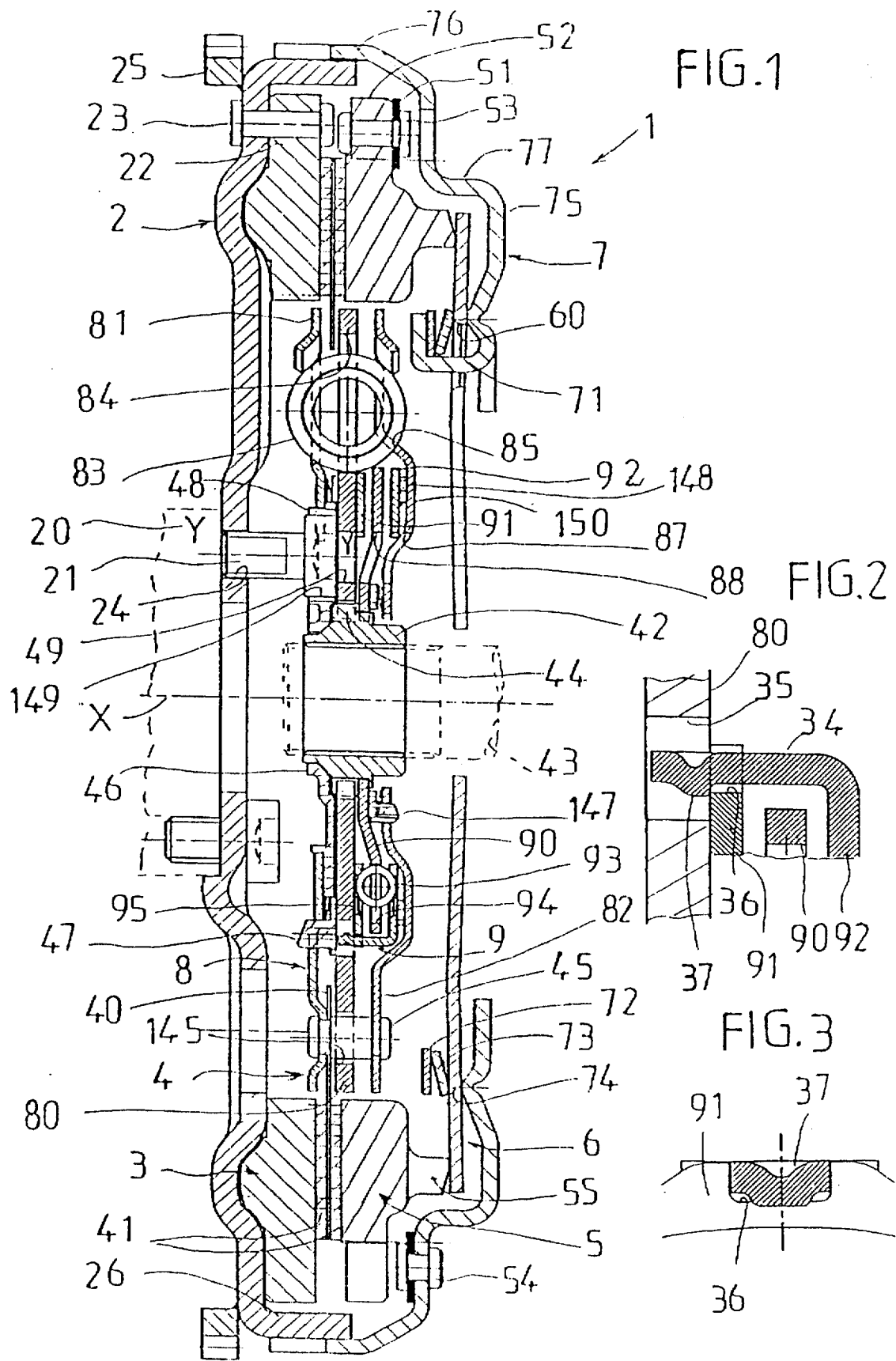

TORSION DAMPER ESPECIALLY FOR A MOTOR VEHICLE

BACKGROUND OF THE INVENTION

1. Field of the Invention

The present invention relates in general terms to torsion dampers, especially for motor vehicles, of the kind comprising an input part and an output part, which are movable circumferentially one with respect to the other within the limits of a predetermined angular displacement, the input part and the output part being coupled together by means of two torsion damping devices giving stepped action, with one of these, referred to as the first device or predamper, being weaker than the other one, which is referred to as the second device or main damper, each of the two said torsion damping devices comprising a damper plate, two guide rings fixed to each other and disposed axially on either side of the damper plate, and circumferentially acting resilient means interposed circumferentially between the damper plate and the guide rings, the damper plate of the predamper being fixed in rotation to the output part, the guide rings of the said predamper being fixed in rotation to the damper plate of the main damper, and the said main damper being mounted on the output part with a clearance which enables the said predetermined angular displacement to take place.

The present invention also relates to a clutch module which includes such a torsion damper.

2. Description of the Prior Art

A torsion damper is described in the document FR-A-2 611 245. It is part of a clutch friction disc which comprises a predamper mounted inside the main damper.

A conventional clutch typically comprises, considered in axial succession, a reaction plate, which may be made in two parts so as to define a damped flywheel, a friction disc which carries friction liners at its outer periphery, a pressure plate, axially acting resilient means, and a cover plate.

Most commonly, the axially acting resilient means consist of a diaphragm, and the assembly of the components consisting of the pressure plate, the diaphragm and the cover plate constitutes a unitary clutch mechanism which is adapted to be fixed on to the reaction plate by means of its cover plate.

In practice, the reaction plate is secured on to a driving shaft by screw fastening, and this screw fastening is carried out before the mechanism is fixed on the reaction plate.

In some cases it may be desirable to form a unitary assembly, referred to as a clutch module, which comprises the clutch mechanism, the friction disc and the reaction plate.

It is then necessary to attach this assembly on to the crankshaft of the engine (the above mentioned driving shaft). With the above mentioned type of damper, a problem arises because it is not possible to gain access through the latter in order to screw the module on to the crankshaft.

In this connection, the predamper is in practice located centrally, in an axial position between one of the guide rings, referred to as the first guide ring, and the damper plate of the main damper.

An object of the present invention is to overcome this drawback in a simple and inexpensive way.

SUMMARY OF THE INVENTION

According to the invention, a torsion damper of the type described above is characterised in that, in order to define a through access passage, the guide rings and the damper plate of the main damper, together with the damper plate of the predamper, are formed with passage holes in axial register with each other defining a common axis, and in that the guide rings of the predamper are mounted radially outwardly of the common axis.

The invention makes it possible to pass a tool through the passage, and it is thus possible to fit the clutch module on to the crankshaft of the engine. With this in view, the guide rings of the predamper are of reduced height, which enables the costs of manufacture to be reduced. As a result, the resilient means of the predamper are radially close to the resilient means of the main damper.

The number of access passages does of course depend on the number of screw fasteners.

The damper plate of the predamper is preferably of a sinuous form, and has an outer portion which is offset axially with respect to its inner portion, which is closer to the damper plate of the main damper.

It is thus possible to reduce the axial size of the damper in the region of the output part, this being possible due to the fact that the guide rings of the predamper are raised, so that the damper plate of the predamper is able to come close at its inner periphery to the damper plate of the main damper.

This offset makes it possible to provide a friction device in the region of the inner portion of the damper plate of the predamper.

According to another feature, the first guide ring of the main damper, which is adjacent to the appropriate guide ring of the predamper, is provided with a projecting bulge for accommodation of the said guide ring of the predamper.

This arrangement avoids any interference with the displacement of the diaphragm.

According to the invention, a clutch module is characterised in that it includes a torsion damper having at least one of the above mentioned features.

The invention will be more clearly understood on a reading of the detailed description of the preferred embodiment of the invention which follows, and which is given by way of example only and with reference to the accompanying drawings.

BRIEF DESCRIPTION OF THE DRAWINGS

FIG. 1 is a view in axial cross section of a clutch module equipped with a torsion damper in accordance with the invention.

FIG. 2 repeats a detail of FIG. 1 on a larger scale.

FIG. 3 is a partial view in the direction of the arrow 3 in FIG. 2.

DETAILED DESCRIPTION OF THE PREFERRED EMBODIMENT

FIG. 1 shows a clutch comprising a clutch module for a motor vehicle and comprising, considered in axial succession, an assembly of generally annular members on a common axis X, namely a reaction plate 2, 3, a friction disc 4, a pressure plate 5, a diaphragm 6 and a cover plate 7.

The reaction plate 2, 3 is arranged to be mounted in rotation on the crankshaft 20 of the internal combustion engine of the motor vehicle, being secured on the said crankshaft, in this example, by means of studs 21.

In this example the reaction plate is in two parts 2, 3, namely a transversely oriented metal support plate 2, and a thrust plate 3 which is here in the form of a casting.

The thrust plate 3 constitutes the reaction plate proper, and for this purpose it makes frictional surface contact with the friction disc 4. The thrust plate 3 is of similar profile to the pressure plate 5.

The thrust plate 3 has radial lugs 22 at its outer periphery, by means of which it is secured on the support plate 2, at the outer periphery of the latter, by means of fasteners 23, which in the present embodiments are rivets, but which may in a modification be screws or bolts.

It will be noted that the thrust plate 3 has, on its surface which is adjacent to the support plate 2, projecting elements which are mounted in recesses formed in the support plate 2, at the outer periphery of the latter and radially inwardly of the rivets 23.

In practice the projecting elements are divided, so that venitlation is obtained between the support plate 2 and the thrust plate 3.

The support plate 2 itself is ribbed, and has holes 24 at its inner periphery, which are spaced apart at regular intervals on a circle for accommodating the studs by which the module is fastened to the crankshaft 20.

The starter crown 25, which is arranged to be driven by the starter of the vehicle, is fixed on this support plate 2, in this example by welding. The support plate 2 has at its outer periphery an axially oriented annular skirt portion 26 on which is mounted the cover plate 7, which is hollow and made of metal, and to this end it has at its outer periphery an axially oriented annular skirt portion 76 which is fitted, by sliding insertion, over the complementary skirt portion 26, being secured to the latter by welding.

In this way the skirt portion 26 enables the cover plate 7 to be both centred and fastened. It also enables the deflection of the diaphragm to be regulated by overlapping the cover plate 7 on the skirt portion 26, to a greater or lesser extent.

The force exerted by the diaphragm can also be regulated in this way.

The friction disc 4 has at its outer periphery a metallic support portion 40, which constitutes the input element of a torsion damper, and which carries, on each of its faces, friction liners 41 which are secured to it by riveting or by adhesive bonding for example, and which may be of divided form, being arranged to be gripped between the reaction plate proper, 3, and the pressure plate 5 of the clutch.

The pressure plate 5, in the form of a casting in this example, is coupled in rotation to the cover plate 7, with relative axial movement being obtained in a manner known per se by means of tangentially oriented resilient tongues 51, the ends of which are fixed, by means of fasteners 53, 54 respectively, on to radial lugs 52 which are provided on the pressure plate 5 at its outer periphery, and on the cover plate 7.

The fasteners 53, 54 consist of rivets, though in a modification they may be screws.

The pressure plate 5 also has an annular ridge 55 of divided form, for engagement by the metallic diaphragm 6, which is of frusto-conical form in its free state.

It will be noted that the cover plate 7 has holes aligned with the rivets 53, to enable the riveting operation to be carried out.

In a manner known per se, the diaphragm 6 comprises a periphral portion in the form of a Belleville ring and a central portion which is divided into radial fingers by slots, which are open at the inner periphery of the Belleville ring into widened apertures 60 through which, in this example, axially oriented assembly lugs 71, formed directly from the sheet metal cover plate 7 by press forming and bending, extend. The free end of the lugs 71 is bent radially outwardly so as to form an abutment flange for a support ring 72. The lugs 71 project from the transversely oriented base portion 75 of the cover plate 7. This base portion 75, which has a central through hole, has a press-formed bead 74 which constitutes a primary abutment for the diaphragm.

A secondary abutment, defined by the outer periphery of a frusto-conical ring 73 which is interposed axially between the diaphragm 6 and the support crown 72, is arranged in facing relationship with the said abutment 74.

In this way, the diaphragm 6 is pivotally mounted between the abutments 74, 73, with the outer periphery of its Belleville ring bearing on the ridge 55 of the plate 5, while at its inner periphery the said Belleville ring is interposed between the abutments 73, 74.

Accordingly, the clutch is of the push to release type, and the diaphragm 6 bears on the cover plate 7 for engagement on the pressure plate 5 and for gripping the friction liners 41 of the disc 4 between the plates 3, 5.

The clutch is thus normally engaged.

In order to disengage the latter, it is necessary to exert a thrust, with the aid of a clutch release bearing (not shown), on the ends of the fingers of the diaphragm 6, so as to cause the latter to deflect in pivoting movement and to release the friction liners 41, with the tongues 51 then urging the pressure plate 5 towards the base portion 75 of the cover plate 7.

The base portion 75 is joined to the skirt portion 76 through a sinuous portion 77 which surrounds the diaphragm 6.

It is of course possible, in place of the lugs 71 and rings 72, 73, to use bars, or any other assembly means, for obtaining the pivotal mounting of the diaphragm 6 on the cover plate 7, and the primary abutment 74 may consist of a ring carried by the transversely oriented base portion 75.

Similarly, the clutch may be of the pull to release type, with the outer periphery of its Belleville ring bearing on the base portion 75, while at its inner periphery the said Belleville ring then bears on the ridge 55.

In order to disengage the clutch, it is necessary to apply a tractive force on the ends of the fingers of the diaphragm 6.

In all cases when the clutch is engaged, the torque is transmitted from the crankshaft 20 to the friction liners 41 and to an internally splined hub 42, which is a component of the friction disc 4.

This hub 42 constitutes the output part of the friction disc 4, and is in engagement with the input shaft 43 of the gearbox, with the clutch, which in this example is in the form of a module, being interposed between the crankshaft 20 and the said shaft 43.

The friction disc 4 is so configured as to constitute a torsion damper for absorbing the vibrations which are generated, especially, by the engine of the vehicle.

To this end, the damper comprises two torsion damping devices 8, 9 arranged for stepped action, namely a first device 9, referred to as a predamper, which, being weaker than the other one, 8, constitutes a bloc mounted inside the second device 8.

In a manner known per se, the first device 9, referred to as the predamper, is arranged so as to act by itself when the torque to be transmitted is very weak, for example during the slow running mode of the engine, while the second device 8, referred to as the main damper, comes into play at higher torques, in the normal running mode of the vehicle.

Each of these devices comprises a damper plate 80, 90 respectively, two guide rings, 81, 82-91, 92 fixed to each other, and resilient means 83, 93 which are interposed circumferentially between the damper plates 80, 90 and the guide rings 81, 82-91, 92, so as to couple the said damper plate resiliently to the said guide rings.

In this example the guide rings are arranged axially on either side of the respective damper plate 80, 90, and the resilient means 83, 93 consist of circumferentially acting resilient members, which are mounted in housings 84, 85-94, 95 formed in facing relationship with each other in the damper plates 80, 90 and in the guide rings 81, 82-91, 92. In this example the guide rings 81, 82-91, 92 and the damper plates 80, 90 are made of metal.

The resilient members 83, 93 consist in this example of coil springs, with the springs 83 being mounted in concentric pairs in the housing 84, 85 in the form of windows, while the springs 93 are mounted individually in the housings 94, 95 which are also in the form of windows.

Some of the members 83, 93 may consist of blocks of resilient material.

The members 83 are preferably mounted in a stepped manner in the housings 84, 85.

More precisely, and in a manner known per se, some of the springs are mounted without any clearance in the windows 84, 85, while others are mounted without a clearance in the windows 85 of the rings 81, 82, and with a clearance in the windows 84 of the damper plate 80.

Similarly, the springs 93 are mounted without any clearance in the windows 95 of the guide rings 91, 92, and some of them may be mounted with a clearance in the windows 94 of the damper plate 90, but without any clearance in the said windows 95.

All of this depends on the particular application, the resilient members 83 being stiffer than the resilient members 93, so that the second device 8 is stiffer than the first device 9, the latter being located axially between one of the guide rings, 82, referred to for convenience as a first guide ring, of the second device 8, and the damper plate 80 of the latter.

The first device 9, referred to as the predamper, is thus located axially between the members 80, 82 (the damper plate and one of the guide rings) of the second device 8, referred to as the main damper.

Accordingly, the first device 9 is mounted within the second device 8, being located radially inwardly of the springs 83.

In this example, and in a manner known per se, the damper plate 80 has on its inner periphery a set of splines, which in this example are trapezoidal in form, and which engage with a clearance with a set of complementary trapezoidal splines formed on the hub 42 at its outer periphery.

Beyond a transverse shoulder, the splines of the hub 42 are of reduced radial depth, and the damper plate 90 of the predamper 9, which in this example is of metal, like the damper plate 80 and the hub 42, has at its inner peripohery splines which are of trapezoidal form in this example, and by means of which it engages without any clearance with the portion of the hub 42 having a reduced radial depth, which is formed in this example on a stepped, thickened portion 44 of the hub 42 that projects radially outwardly at its outer periphery.

In a manner known per se, the damper plate 90 is thus lcoated axially on the hub 42 in one direction by means of the shoulder which is defined by the step of the thickened portion 44, and in the other direction by seaming, making use of the reduced depth of the splines.

A friction device 47, associated with the second device 8, is interposed axially between the damper plate 80 and the guide ring 81. This device comprises a friction ring, in contact with the damper plate 80 and having spigots which extend axially through corresponding apertures which are formed in the guide ring 81 so as to couple it in rotation with the said ring.

An axially acting resilient member, which in this example is a Belleville ring, is interposed between the ring of the friction device 47 and the guide ring 81.

Similarly, a friction device 147, associated with the first device 9 and similar to the friction device 47, is interposed between the guide ring 82 and the damper plate 90 of the device 9, which is mounted axially on the hub 42 via the thickened portion 44.

The friction device 147 therefore comprises a ring which is in frictional engagement against the damper plate 90, and which is caused to rotate, through its spigots, by the guide ring 82, being acted on by a resilient member of the Belleville ring type. The spigots of the said ring extend through apertures in the ring 82, so as to give the said rotational coupling.

A conical bearing 46 surrounds the hub and is in centring contact with the latter. The bearing 46 comprises a plate element and enables the guide ring 81 to be centred by means of a centring collar portion, which has no reference numeral, and bushes 48 which will be described later herein.

It will be noted that the guide rings 81, 82 are connected together by means of spacer bars 45, which also serve for fastening the friction disc 40, with each of the spacer bars 45 passing, with a clearance, through an aperture 145 formed for this purpose in the damper plate 80.

In this example the guide rings 91, 92 are of metal, and one of the rings, namely the ring 92, includes assembly lugs 34 (FIG. 2), which are oriented axially and which project integrally from the outer periphery of the latter. These lugs extend radially outwardly from the outer periphery of the damper plate 90, and each of them passes, with a fitting clearance, through a complementary slot 36 which is formed at the outer periphery of the guide ring 91.

The free end of the assembly lugs 34 is adapted to constitute a projection for driving the damper plate 80, and is deformed radially inwardly so as to define a retaining means 37 which is arranged to cooperate with the surface of the guide ring 91 that faces away from the damper plate 90 (FIG. 3).

The deformations 37 are initially formed, before being introduced into the slots 36, in such a way that a snap-fitting means is formed, with resiliently deformable assembly lugs 34 acting between the two guide rings 91, 92, which are thus connected together.

A radial clearance exists between the inner edges of the slot 36 and the assembly lugs 34.

In this example the deformations 37 consist of dents, but they may of course consist of pressed-out portions.

In this example, the deformations 37 are formed in the centre of the assembly lugs 34, leaving inact the lateral edges of the said lugs for cooperation with the lateral edges of the slots 36. In this example these deformations 37 are hemispherical.

The assembly lugs 34 are formed on radial projections of the second guide ring 92 at its outer periphery, between two consecutive springs 83, while the slots 36 are formed in radial projections of the guide ring 91 at its outer periphery, in facing relationship with the projections of the guide ring 92. In this embodiment the slots are open outwardly.

The free end of each of the lugs 34 penetrates into a complementary, circumferential aperture 35 which is formed in the damper plate 80.

In this way, the guide rings 91, 92 are coupled in rotation to the damper plate 80 through the said apertures 35, which are in the form of through holes. Thus the said guide rings 91, 92 are coupled together by way of the lugs 34, the apertures 36 and the deformations 37, assembly being carried out by snap-fitting of the deformations on to the inner edges of the apertures 36.

During the relative movement between the input part 40, 41 and the output part 42 of the torsion damper, in a first stage the springs 93 are compressed because the springs 83 are stiffer, so that the guide rings 81, 82 are then solid with the damper plate 80.

During this phase, a small amount of friction occurs between the damper plate 90 and the spigoted ring of the friction device 147. This friction is governed by the Belleville ring of the device 147, which is so designed that it does not obscure the action of the springs 93.

This movement is continued until the angular clearance between the damper plate 80 and the hub 42 has been taken up.

Thus in a second phase, the springs 93 are allowed to become compressed, and the friction device 47 comes into play.

During this second phase, the springs 93 remain in their compressed state, because no relative movement occurs between the damper plates 80, 90.

Friction takes place between the guide rings 92, 82, and in order to avoid any metal to metal contact, a friction ring 148, which is fixed to the ring 92, for example by adhesive bonding, is interposed between the rings 92, 82.

Friction also takes place permanently between the hub 42 and the bearing 46, which is coupled in rotation to the guide ring 81 in a manner to be described below.

In the present example, the clutch module 1, which has been preassembled, is fitted on to the crankshaft 20.

To this end, the diaphragm 6 is formed with holes to allow tools to be passed through them for fastening the studs 21, which preferably have hollow heads. More precisely, some of the fingers of the diaphragm 6 are provided with the said access holes at their inner periphery.

For this purpose, according to the invention, the torsion damper of the type described above is characterised in that, in order to define a through passage, the guide rings 81, 82 and the damper plate 80 of the main damper, together with the damper plate 90 of the predamper, are formed with access holes 87, 88, 49, 149 which are in axial register with each other and define a common axis Y—Y, and in that the guide rings 81, 82 of the predamper are fitted radially outwardly of the said common axis Y—Y. In the present case an access hole 87, 88, 49 is arranged, by means of studs 21, in axial register in the guide ring 82, the damper plate 90 and the damper plate 80 respectively, and the bearing 46 also has, in a manner to be described below, access holes 149 which are in axial register with the said access passages. The holes 149 associated with the guide ring 81 are thus formed in the bearing 46.

This makes it possible to pass a tool through the access passage 87, 88, 49, 149 for the purpose of mounting the module on to the crankshaft 20, the holes in the diaphragm 6 being in axial register with the said passages.

In the present embodiment the guide rings 91, 92 are of reduced height, and, in one embodiment, their internal diameter is such as not to interfere with the said passage 87, 88, 49, 149 for the screw fastening tool.

In a modification (FIG. 1), the inner periphery of the guide rings 91, 92 is notched locally at the level of the passages in accordance with the invention, to allow access for the tool.

In practice the internal diameter of the guide rings 91, 92 is accordingly determined by the size of the tools employed, extend and the latter extend at a distance from the axis Y—Y and radially outwardly of the latter.

The profile of the damper plate 90 is sinuous, and it comprises an outer portion which is interleaved between the two guide rings 91, 92, with an axial clearance. This outer portion is joined, through an inclined portion having holes 88 to allow access for the screw fastening tool, to a transverse inner portion which is parallel to the outer portion. The inner portion extends as far as the vicinity of the damper plate 80. In this example there is a slight clearance between the damper plate 80 and the said inner portion, so as to minimise friction effects. This is possible because the radial height of the guide rings 91, 92 is reduced, with the guide ring 91 having a central portion through which a hole is formed.

It will be noted that the springs 93 are radially close to the springs 83, and that the friction device 147 acts on the said inner portion, and that the axial offset between the said outer portion (spaced away from the damper plate 80) and the said inner portion (adjacent to the damper plate 80) provides space for fitting of the friction device 147.

The (first) guide ring 82 has a projecting bulge 150 for accommodating the guide ring 92 and the friction ring 148. This bulge, which in this example has a generally trapezoidal cross section, extends axialy towards the diaphragm 6. It is in the inclined junction ortion of the guide ring 82 that the access holes 87 of the passages in accordance with the invention are formed.

As will have been understood, the torsion damper has a reduced thickness in the region of its hub 42, due to the configuration of the damper plate 80 and due to the bulge 150, which can readily be press-formed.

Thus, during actuation of the clutch, the inner ends of the fingers of the diaphragm will not interfere with the damper. The bulge 150 similarly does not affect the movement of the diaphragm 6, the fingers of which are in this example slightly inclined towards the base portion 75 (FIG. 1).

In accordance with one feature, the access passage in accordance with the invention is formed indirectly in the guide ring 81 furthest away from the device 9, by virtue of the bearing 46 which has annular seatings 48. The bearing 46 is preferably made of a synthetic material.

More precisely, the said seatings are in the form of bushes 48 which have an internal bore 149, and the head of the studs 21 is fitted snugly into these seatings before the clutch module 1 is fitted on to the crankshaft 20. The bushes 48 are cylindrical and define a continuous circle. Thus the bores 149 are part of the access passages in accordance with the invention.

It will be noted that the guide ring 81 is relieved in the centre of its radially inner part, for mounting of the bearing 46.

This bearing, with its bushes, is of the same type as that which is described in the document FR 93 11325 filed on 23 Sep. 1993, to which reference may be made. The holes 149 are accordingly formed in the assembly consisting of the bearing 46 and the guide ring 81.

It follows that the studs 21 are initially held by the torsion damper by being fitted into the bushes 48, and the guide ring 81 does not interfere with the passage of the screw fastening tools.

It will be noted that the guide ring 81 has tooth-like elements at its inner periphery, which are engaged between the bushes 48 of the bearing 46, for coupling the bearing 46 in rotation with the guide ring 81.

The invention enables a compact clutch module to be provided, having screw fasteners 21 which are secured against loss, and with a raised predamper 9.

It is moreover possible to adjust the gripping force exerted by the diaphragm 6, by overlapping the skirt portion 76 to a greater or lesser extent over the skirt portion 26.

The guide rings of the predamper 9 may of course be made of a synthetic material, as may the damper plate 90, as is described in the document FR-A-2 611 245. In that case, the ring 92 is of increased thickness, and the ring 148 is omitted.

It is however preferable that the said damper plate be made of metal, so as to facilitate its manufacture in a sinuous form and to reduce the axial dimensions.

In this example the holes 49, 87 and 88 have a common diameter (the same being true for the holes in the diaphragm 6), but this is not obligatory, and some of the holes may have a larger diameter. In the present case it is the damper plate 80 which has the smaller holes 49, in the interests of mechanical strength.

The bearing 46 may have a reduced radial size, and the passages 149 may be omitted from it. In that case it is necessary to form access holes directly in the guide ring 81. It will be noted that here, the relevant axial end of the thickened portion 44 of the hub 42, in that part of the portion 44 that has a reduced radial height, is deformed by seaming into contact with the inner periphery of the damper plate 90, for the purpose of forming, in a manner known per se, a sub-assembly consisting of the hub and the predamper 9. This is of course not obligatory.

In all cases the predamper is thickner at its outer perihery than at its inner periphery.

The axially acting resilient rings of the friction devices 47, 147 may of course consist of corrugated resilient rings instead of Belleville rings, and the friction ring 148 may be fixed to the guide ring 82 (to the bulge of the latter), or it may be freely mounted between the two rings 92, 82.

A low friction ring may be interposed between the two damper plates 80, 90 at the inner periphery of the latter.

It is of course evident, in the light of the foregoing description and the attached drawings, that the springs of the predamper 9 are fitted radially outwardly of the axis Y—Y, due to the fact that they are lodged in the guide rings 91, 92.

We claim:

1. A torsion damper comprising: an input part (40, 41) and an output part (42), which are movable circumferentially one with respect to the outher within the limits of a predetermined angular displacement, the input part (40, 41) and the output part (42) being coupled together by means of two damping devices (8, 9) giving stepped action, with one of these (9), referred to as the first device or predamper, being weaker than the other one (8), which is referred to as the second device or main damper, each of the two damping devices comprising a damper plate (80, 90), two pairs of guide rings (81, 82–91, 92), each pair having its respective guide rings fixed to each other and respectively disposed axially on both sides of a respective one of said damper plates (80, 90), and circumferentially acting resilient means (83, 93) interposed circumferentially between the damper plates (80, 90) and the guide rings (81, 82–91, 92), the damper plate (90) of the predamper (9) being fixed in rotation to the output part (42), while the guide rings (91, 92) of the predamper are fixed in rotation to the damper plate (80) of the main damper (8), the damper plate (80) of the main damper (8) being mounted on the output part (42) with a clearance which enables the predetermined angular displacement to take place, and in which the predamper (9) is mounted axially between the damper plate (80) and one (82) of the guide rings of the main damper, referred to as the first guide ring (82), wherein, in order to define a through passage, the guide rings (81, 82) and the damper plate (80) of the main damper (8), together with the damper plate (90) of the predamper (9), are formed with holes (149, 87, 49, 88), referred to as passage holes, in axial register with each other and defining a common axis (Y—Y), the guide rings (91, 92) of the predamper (9) are mounted radially outwardly of the common axis, and the damper plate (90) of the predamper (9) has an outer portion which is offset axially with respect to an inner portion, which is closer to the damper plate (80) of the main damper (8).

2. A damper according to claim 1, wherein said inner portion is joined to the outer portion of the damper plate (90) of the predamper (9) through an inclined portion having the passage holes (88).

3. A damper according to claim 2, wherein a friction device (147) is arranged between the inner portion of the damper plate (90) of the predamper (9) and the first guide ring (82) of the main damper (8).

4. A damper according to claim 3, wherein the friction device (147) comprises a ring engaging frictionally against the damper plate (90) of the predamper (9) by being actuated in rotation by the first guide ring (82) of the main damper (8).

5. A damper according to claim 1, wherein a clearance exists between the damper plate (80) of the main damper (8) and the said inner portion of the damper plate (90) of the predamper (9), whereby to minimise friction.

6. A damper according to claim 1, wherein the first guide ring (82) of the main damper (8) which is adjacent to the appropriate guide ring (92) of the predamper (9), is provided with a projecting bulge (150) for accommodation of the said guide ring (92) of the predamper (9).

7. A damper according to claim 6, wherein the said bulge (150) contains a friction ring (148) interposed between the said guide rings (82, 92) of the main damper (8) and predamper (9) respectively.

8. A damper according to claim 1, wherein the passage holes (149) which are associated with the guide ring (81) of the main damper furthest away from the predamper (9) are defined by a bush (48), which is part of a bearing (46) interposed radially between the output element (42) and the appropriate said guide ring (81) of the main damper (8).

* * * * *